United States Patent
Cochran et al.

(10) Patent No.: US 7,116,916 B2
(45) Date of Patent: Oct. 3, 2006

(54) METHOD AND APPARATUS FOR COMPACTING DATA IN A COMMUNICATION NETWORK

(75) Inventors: Robert A. Cochran, Roseville, CA (US); David E. Oseto, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 676 days.

(21) Appl. No.: 10/209,023

(22) Filed: Jul. 31, 2002

(65) Prior Publication Data

US 2004/0022546 A1 Feb. 5, 2004

(51) Int. Cl.
 *H04B 10/04* (2006.01)
(52) U.S. Cl. ........................ 398/183; 398/182; 398/186; 398/189; 398/190; 398/191; 398/202; 398/214; 398/141; 332/109; 332/107; 327/172; 327/175; 327/176; 375/238; 331/45; 331/49; 331/17
(58) Field of Classification Search .............. 398/191, 398/182, 183, 186, 189, 190, 202, 214, 141; 332/109, 107; 327/172, 175, 176; 375/238; 331/45, 49, 17
See application file for complete search history.

(56) References Cited

U.S. PATENT DOCUMENTS

| | | | | | |
|---|---|---|---|---|---|
| 4,713,841 A | * | 12/1987 | Porter et al. | ................. | 398/191 |
| 5,138,118 A | * | 8/1992 | Russell | ..................... | 178/19.03 |
| 5,448,629 A | * | 9/1995 | Bosch et al. | ................. | 398/191 |
| 5,994,973 A | * | 11/1999 | Toki | ........................... | 332/109 |

* cited by examiner

*Primary Examiner*—Hanh Phan

(57) ABSTRACT

A pulse width of a pulse having a nominal pulse width is modulated in accordance with a digital value to be communicated. The number of clock cycles that the modulated pulse width exceeds the nominal pulse width is counted. Various embodiments use a counter to determine the extent that the modulated pulse exceeds the nominal pulse width. The counter is initialized to a value (P) upon detection of a first edge of the extended pulse. The counter is configured to rollover or is reset when the counter reaches a count of P+M, where M represents the nominal pulse width count. In various embodiments, P is zero. The counter is halted upon detection of a second edge of the extended pulse. The resulting count represents the digital data value.

17 Claims, 8 Drawing Sheets

METHOD AND APPARATUS FOR COMPACTING DATA IN A COMMUNICATION NETWORK

FIELD OF THE INVENTION

This invention relates to the field of communication networks. In particular, this invention is drawn to compacting digital data transmitted over a serial link of a communication network such as an optical communication network.

BACKGROUND OF THE INVENTION

Optical fibers offer many advantages over traditional wires in communications networks. Data is encoded by modulating an optical signal that is transmitted along the optical fiber to a receiver. The data is subsequently recovered through demodulation of the received optical signal.

Due to the nature of the optical signal and the transmission medium, communication through the use of optical pulses is preferred over phase, amplitude, or frequency modulation of a sinusoidal carrier. One such encoding technique frequently used to communicate analog information in a public switched telephone network is pulse code modulation. Pulse code modulation uses groups of pulses in specific patterns to represent individual digital values. PCM digitally encodes the sampled analog data such as speech by providing a pulse sequence corresponding to a digitized sampled value.

One disadvantage of PCM is that lookup tables are required for encoding and decoding circuitry. Another disadvantage is that a frame sizeable enough to accommodate the largest pulse sequence is required to communicate each code. A four bit optical PCM frame is limited to representing one of sixteen values despite the ability of electronic equipment to switch faster and thus sustain greater data capacity in the same time frame.

SUMMARY OF THE INVENTION

In view of limitations of known systems and methods, methods and apparatus for communicating digital data using pulse width modulated signals are provided.

Generally, a pulse width of a pulse having a nominal pulse width is extended in accordance with a digital value to be communicated. The number of clock cycles that the extended pulse width exceeds the nominal pulse width is counted. The count corresponds to the digital value. Various embodiments use a counter to determine the extent that the modulated pulse exceeds the nominal pulse width.

In one embodiment, the counter is initialized to zero upon detection of a first edge of the extended pulse. Although the counter counts throughout the duration of the pulse, the counter is reset to zero when a count representing the nominal pulse width is reached. The counter is halted upon detection of a second edge of the pulse. The resulting count represents the digital data value.

In another embodiment, the counter is initialized to zero upon detection of a first edge of the extended pulse. Although the counter counts throughout the duration of the pulse, the counter is designed to rollover upon reaching a count representing the nominal pulse width. The counter is halted upon detection of a second edge of the extended pulse. The resulting count represents the digital data value.

In other embodiments, the counter is initialized to a non-zero value (P) upon detection of a first edge of the extended pulse. The counter is configured to rollover or is reset when the counter reaches a count of P+M, where M represents the nominal pulse width count. The counter is halted upon detection of a second edge of the extended pulse. The resulting count represents the digital data value.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Optical networks typically communicate information using pulses of optical energy (e.g., light) communicated through an optical fiber linking a transmitter and receiver. Optical fibers offer a secure high speed, high capacity communication medium with very high immunity to noise compared to copper connections. Optical fibers are not susceptible to crosstalk and they provide a low attenuation communication medium. The communicated signals are not susceptible to signal jitter. Optical fibers thus reduce the need for error detection and correction protocols otherwise associated with wired telephone lines.

Figure 1:
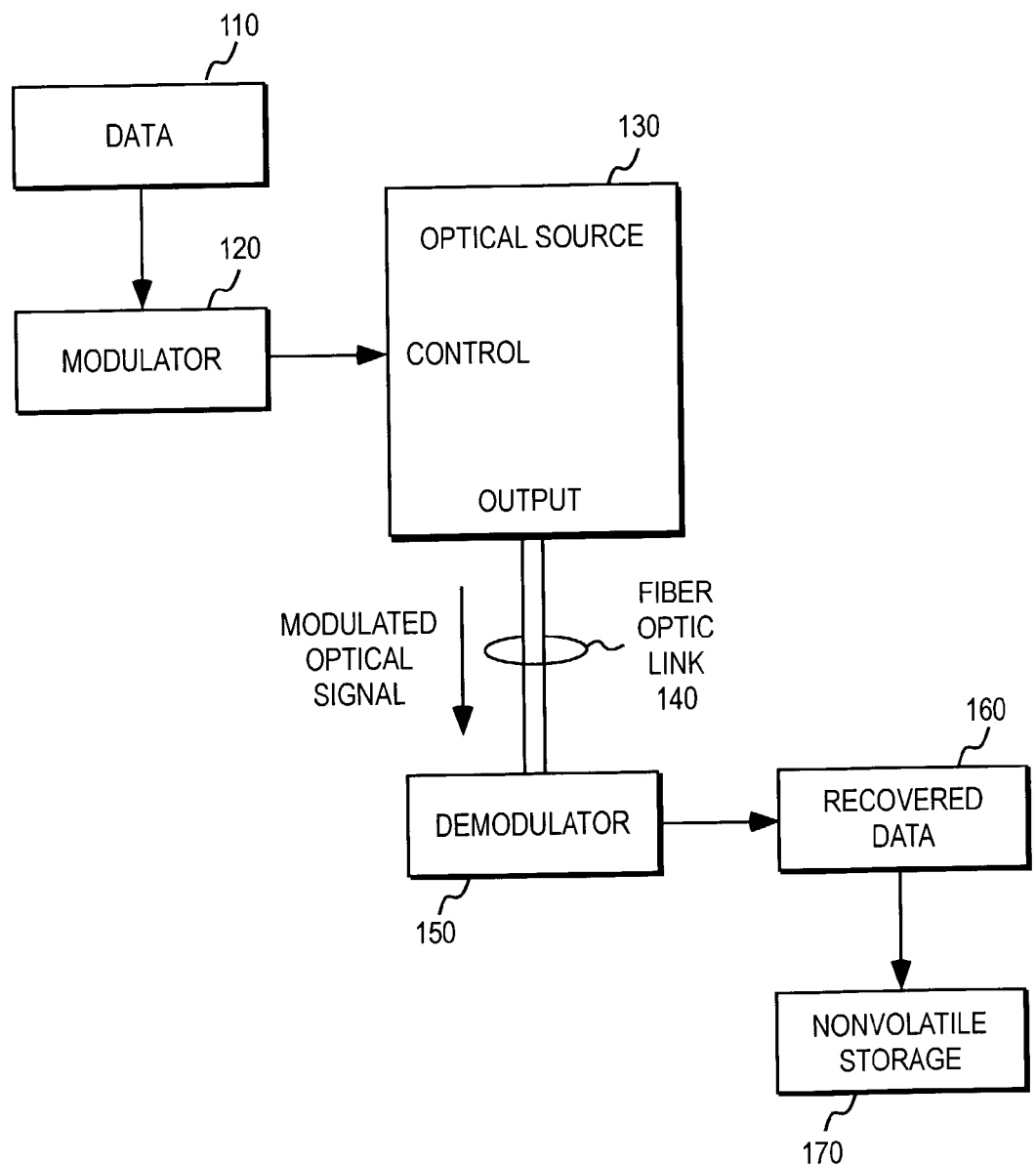
FIG. 1 illustrates one embodiment of an optical communication link between a computer host and a data storage system.

FIG. 1 illustrates one embodiment of an optical network used to communicate data 110 from one location to another for purposes of storing the data in a nonvolatile memory 170. Such an arrangement may be desirable for off-site backup of a datacenter.

Data 110 is provided to a modulator 120. The modulator 120 varies a control input of the optical source 130 in accordance with the value of the data 110. Optical source 130 generates a modulated optical signal suitable for transmission. The modulated optical signal may be communicated along a fiber optic cable 140. The fiber optic cable may be a single mode or a multimode fiber.

The modulated optical signal is provided to a demodulator 150. The demodulator extracts the data from the modulated optical signal to provide recovered data 160. Due to high noise immunity and data carrying capacity of optical communication links, optical fiber provides a secure medium to communicate sensitive data to an off-site location where the recovered data may be preserved in a storage area such as nonvolatile storage 170.

Figure 2:
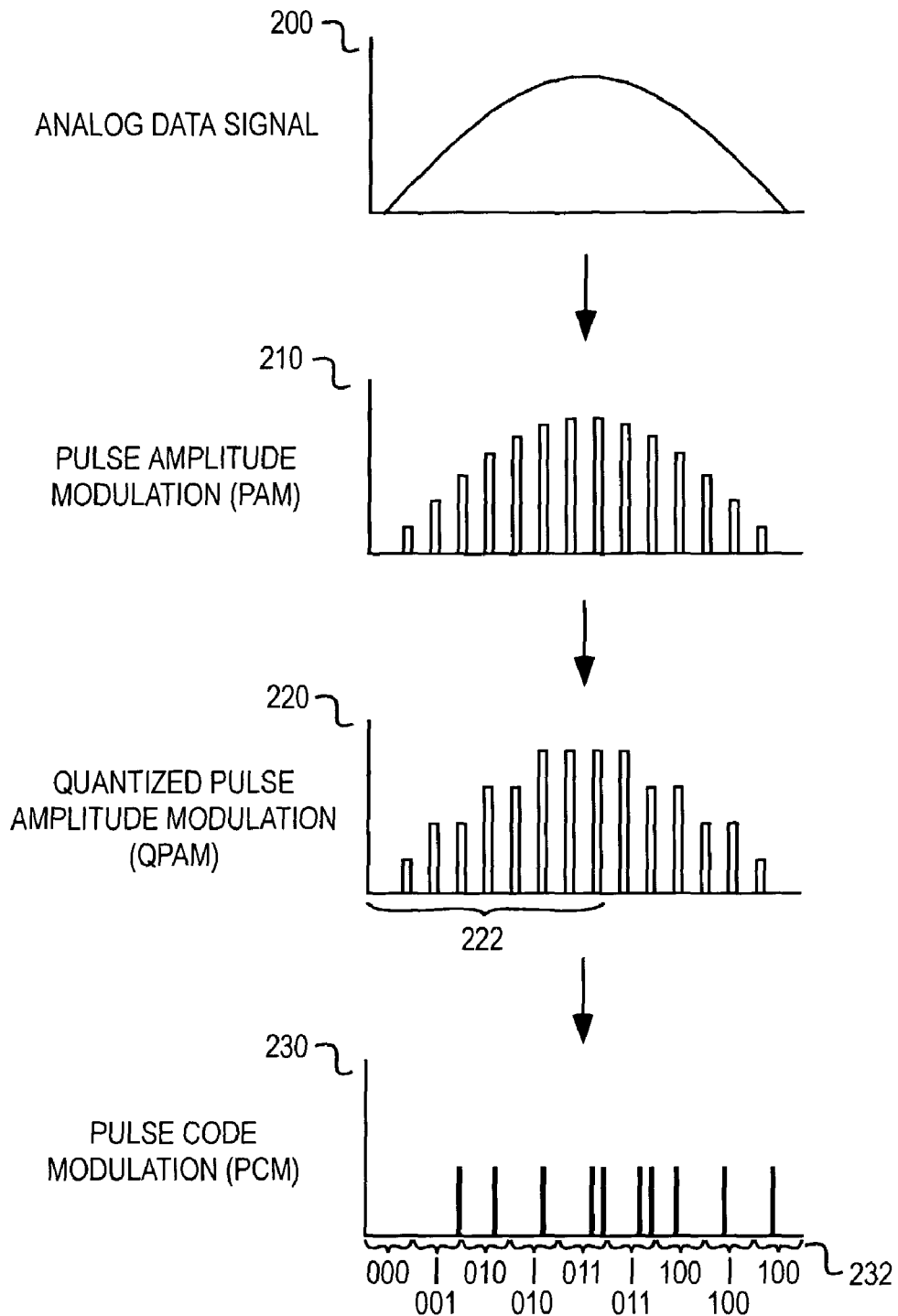
FIG. 2 illustrates various forms of pulse modulation.
Figure 3:
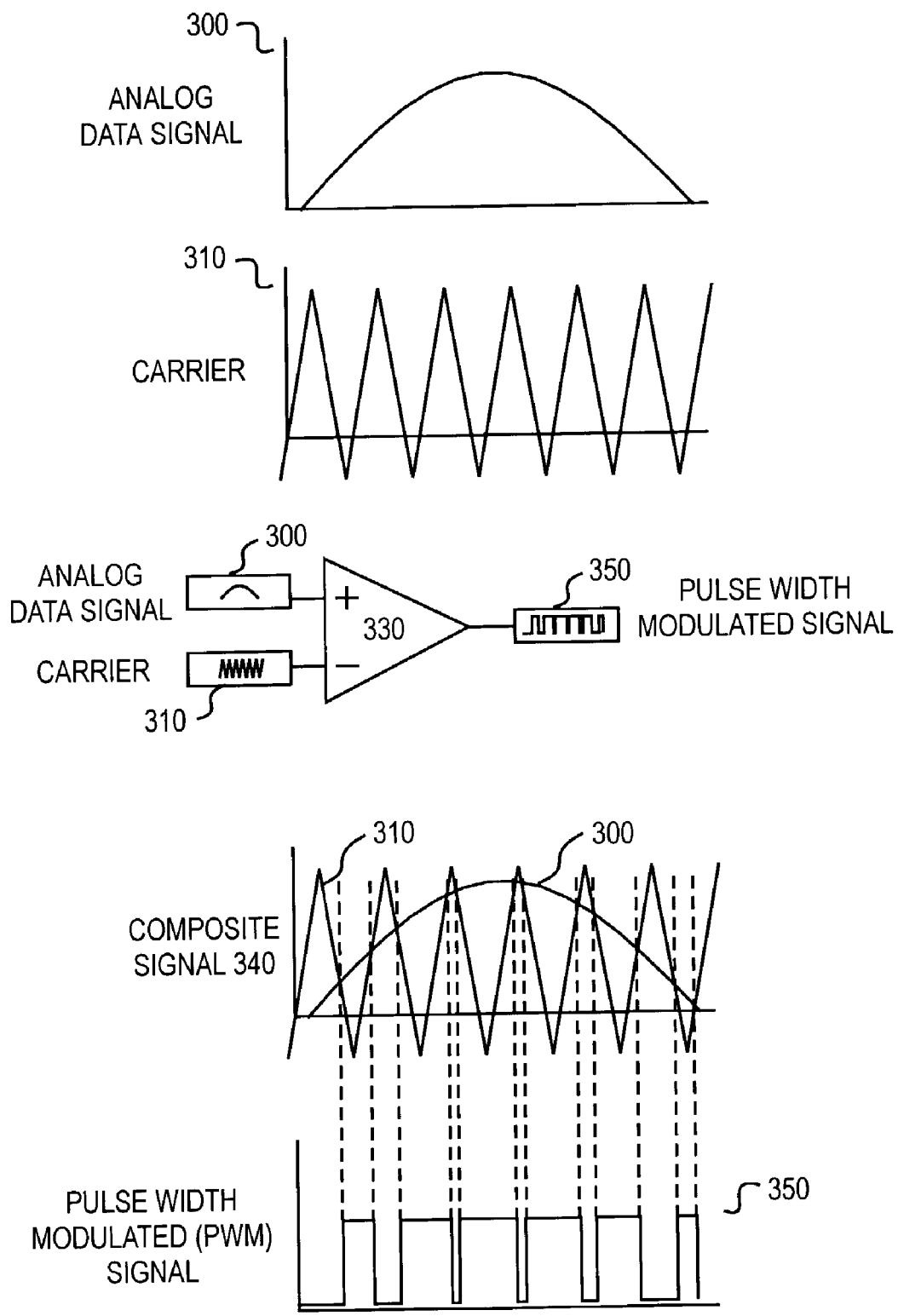
FIG. 3 illustrates analog pulse width modulation for an analog data signal.

Numerous forms of modulation are available. Due to signal dispersion, optical fibers tend to be suited for communicating pulse modulated optical signals. Various forms of pulse modulation include pulse position, pulse amplitude, pulse number, pulse width, and pulse code modulation. FIGS. 2 and 3 are provided for comparing various forms of pulse modulation, particular when applied to communication of analog data.

FIG. 2 illustrates various forms of pulse modulation suitable for communicating an analog signal. Pulse position, pulse amplitude, pulse number, and pulse width modulation typically entail varying the named characteristic of a pulse train (i.e., carrier signal) within a reference frame in accordance with some characteristic (e.g., amplitude) of the modulating signal to communicate information.

Pulse position modulation (PPM) varies the temporal position of a pulse otherwise having a predetermined occurrence frequency within a reference frame. Pulse amplitude modulation (PAM) varies the pulse amplitude. Modulated signal 210 illustrates amplitude modulation of a pulse train using analog data signal 200. Pulse number modulation varies the number of pulses occurring within the reference frame. Pulse number or pulse frequency modulation (PFM) are also referred to as frequency shift keying when discrete frequencies are used. Pulse width modulation (PWM) varies the width of the pulse.

Pulse position, pulse number, pulse width, and pulse code modulation are digital modulation schemes due to the "on" or "off" nature of the modulated signal because the receiver need only detect whether the pulse is "on" or "off". Pulse amplitude modulation, however, is inherently analog due to the varying intensity of the optical signal.

Pulse position, number, amplitude, and width modulation are typically used to communicate analog information by manipulation of the named characteristic of a carrier signal. The analog data may be recovered as analog data through the use of low pass analog filters. In contrast, pulse code modulation (PCM) does not rely on modulation of a carrier signal. PCM is inherently digital due to the use of a finite set of patterns within a reference frame.

As a result, any analog information to be communicated using PCM must first be quantized. Analog data such as speech is sampled at a given frequency. Referring to FIG. 2, PAM is applied to the analog signal 200 resulting in a PAM signal 210. PAM results in a time quantized signal. The PAM signal is further quantized in amplitude as indicated by quantized PAM (QPAM) signal 220. QPAM permits the amplitude values to exist only at a finite number of discrete levels.

An analog-to-digital conversion is performed on each data sample to produce a representative digital code. Each quantized amplitude value has an associated PCM code represented by patterns of pulses (i.e., a digital code) within the reference frame. Each digital code is communicated as a group of pulses of light using on-off keying. When received, the group of pulses is readily detected as the digital code from which the speech sample can be reconstructed. PCM is thus inherently digital. Analog information is communicated via PCM only after analog-to-digital conversion.

Determination of the pattern for encoding or decoding requires a lookup table for translating between analog values and PCM codes. PCM signal 230 corresponds to portion 222 of QPAM signal 220. PCM signal 230 consists of a series of reference frames 232, each frame associated with a corresponding pulse of the QPAM signal 220. Each frame has a pulse pattern corresponding to the quantized amplitude value of its associated QPAM signal pulse.

FIG. 3 illustrates analog pulse width modulation in greater detail. A comparator can be used to create a PWM signal. The analog data signal 300 is applied to one input of the comparator 330. A carrier such as 310 is provided to another input of the comparator. In the illustrated embodiment, when the value of the data signal exceeds the value of the carrier, the comparator outputs a "1". Otherwise, the comparator outputs a "0". This results in a PWM signal 350. A composite 340 of the analog data and carrier signals is provided to illustrate the derivation of the PWM signal 350.

In one embodiment, a square wave (rather than a sawtooth wave) with a pre-determined nominal frequency is provided as the carrier signal. The analog data modulates the width of the carrier signal pulses. The analog data thus modulates the duty cycle of the square wave carrier signal. Typically, pulse width modulation is used for application of a variable voltage to a powered device. The effective voltage provided is proportional to the duty cycle of the PWM signal. Such modulation is popular for motor speed control and light dimmer circuitry.

Fiber optic networks frequently use pulse code modulation. The width of a pulse may be referred to as the standard bit time or width. Optical networks require a pre-determined minimum standard bit time for either a "one" or a "zero" to ensure distinguishing between pulses. Without regard to error correction or other overhead, a nibble of information requires at least 8 standard bit times.

Instead of PCM, a digital form of PWM may be used to communicate digital data values. The width of the pulse indicates the digital value communicated. Instead of a low pass analog filter, however, counters are used to extract the digital data. Unlike analog PWM as illustrated in FIG. 3, digital PWM does not require a carrier. Digital PWM does, however, require synchronized transmitter and receiver clocks running at substantially the same frequency so that the amount of time that the modulated pulse has been extended can be accurately determined. Although the PCM solution required 4 bits per reference frame, the PWM method can represent either 1) a greater number of bits in the same time frame, or 2) the same number of bits in a smaller reference frame. Thus the PWM method accomplishes compaction.

Figure 4:
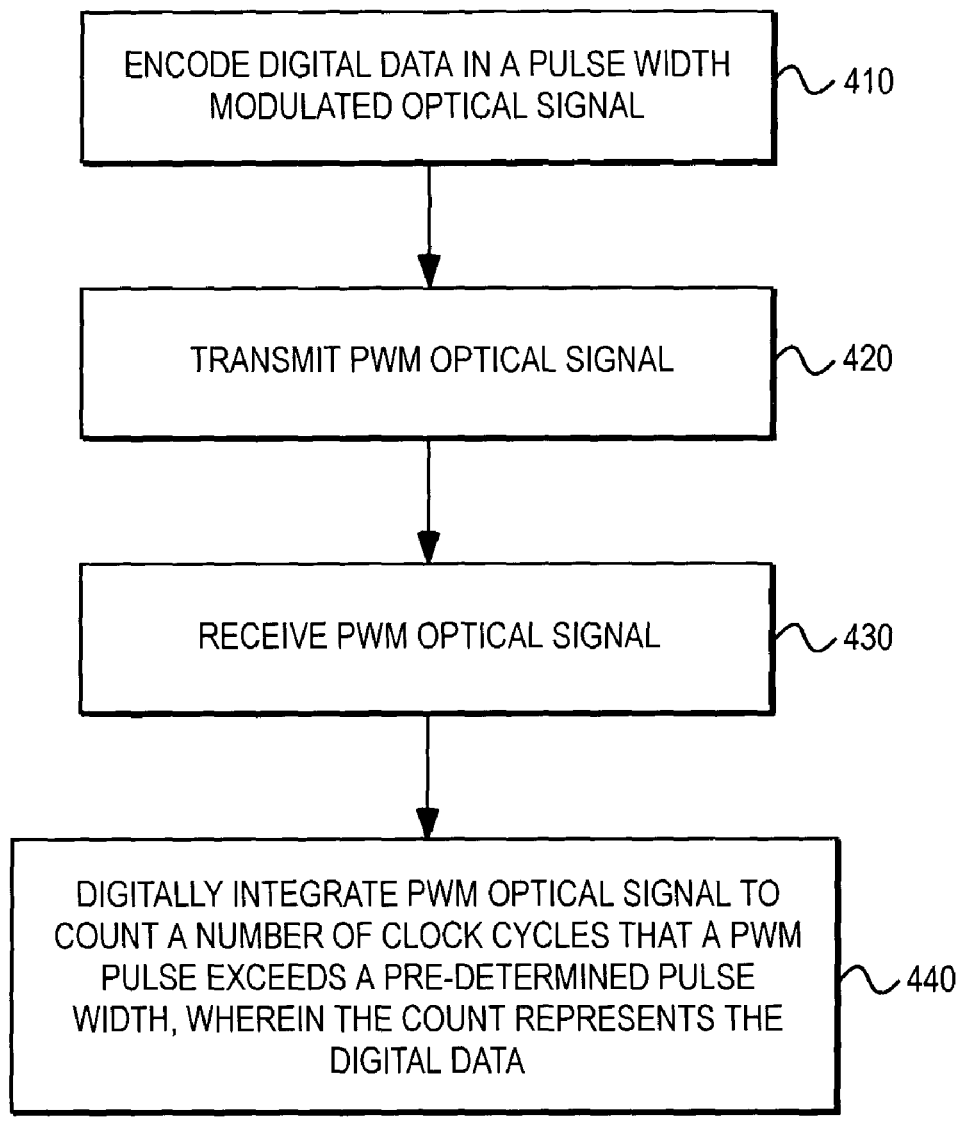
FIG. 4 illustrates one embodiment of a method for communicating compacted digital data in an optical serial bit stream.

FIG. 4 illustrates one embodiment of a method of compacting data for serial transmission in an optical network. In step 410, digital data is encoded in a pulse width modulated optical signal. The PWM optical signal is transmitted in 420. On the receiver side, the PWM optical signal is detected in step 430. The number of clock cycles that the digital PWM pulse exceeds a nominal pulse is counted in step 440. The count corresponds to the length of a pulse and the value of the digital data being communicated.

Figure 5:
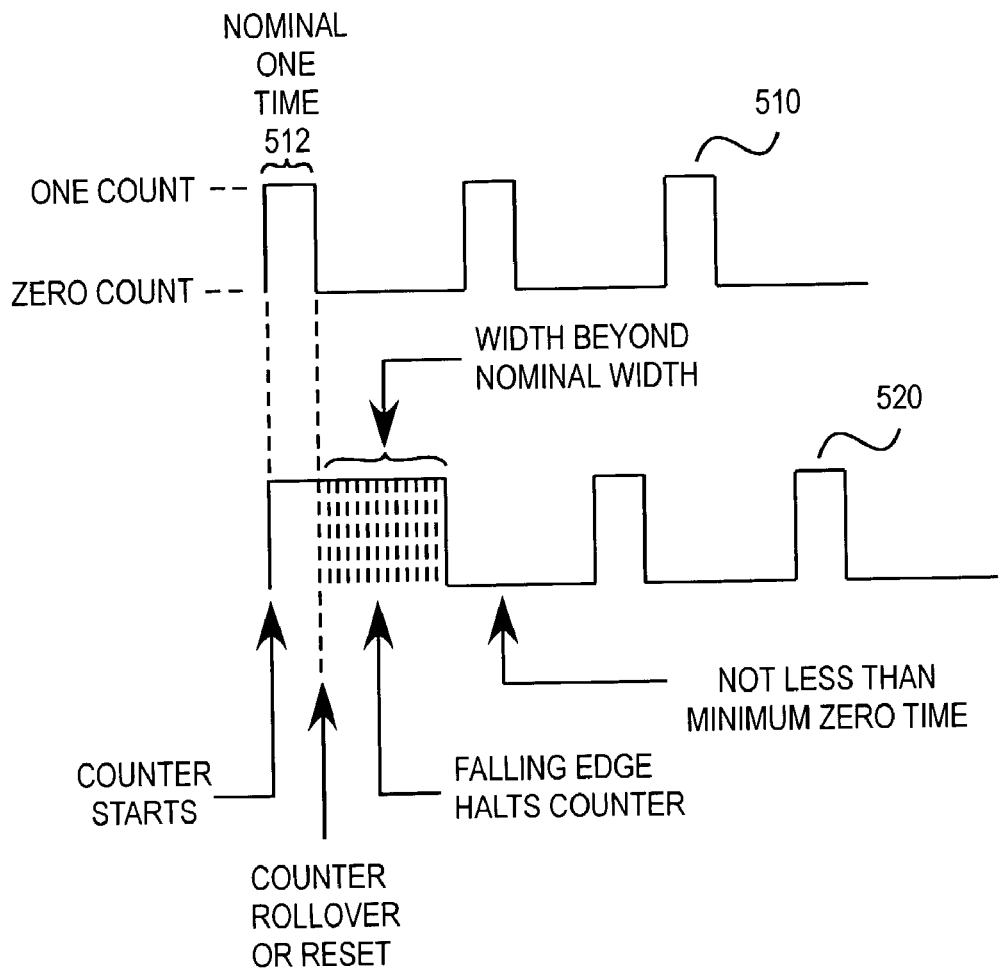
FIG. 5 illustrates one embodiment of digital pulse width modulation of an optical signal for communicating digital data.

FIG. 5 illustrates encoding of digital data through modulation of pulse width. An unmodulated pulse train waveform 510 has two states, "one" or "zero". Each "one" is indicated by a pulse of a nominal width (512). The duration of the pulse is referred to as the "one time" or "one count". The length of time between pulses is referred to as the "zero time" or "zero count".

Digital data is communicated by modulating the pulse train waveform 510 to produce a pulse width modulated waveform 520. The modulation effectively shifts the falling edge of the modulated pulse.

In one embodiment, the nominal pulse width is only increased (i.e., rather than decreased) to encode the digital information. The pulse width is increased only in discrete amounts such that the falling edge of the pulse may occur only at n possible locations including the position of the falling edge of the nominal pulse. In one embodiment, the maximum modulated pulse width is twice the nominal pulse width.

The rising edge of a pulse indicates the transmission of a new digital data value. The falling edge of the pulse indicates the end of the transmission of the digital data value and is in fact determinative of the value. The data value may be recovered by determining the amount that the modulated pulse width exceeds the nominal pulse width. In one embodiment this is determined by a demodulation counter.

Analog low pass filters serve as demodulators for analog PWM. The analog low pass filter effectively recovers the lower frequency modulating (i.e., data) signal from a higher frequency modulated carrier for analog modulated schemes. The low pass filter is a lossy integrator.

Due to the pulse form of the modulated signal, a counter effectively is a digital integrator. Unlike the low pass analog filter, however, the counter is unaffected by the amplitude, phase, or frequency of the modulated signal (except for the triggering thresholds that start or stop the counter). Given that the digital data is indicated only by the change in nominal pulse width rather than the total pulse width, the counter must account for the nominal pulse width.

In one embodiment, this is accomplished by integrating or counting throughout the entire pulse width and subtracting a nominal pulse width count. Alternatively, the counter may be reset or configured to rollover at the count associated with the standard bit time (i.e., nominal pulse width count). This is similar to a lossy integrator wherein the occurrence of an integrator reset is determined by the nominal pulse width and the clock frequency. Unlike analog encoding, no true "carrier" or "pulse train" is required.

Figure 6:
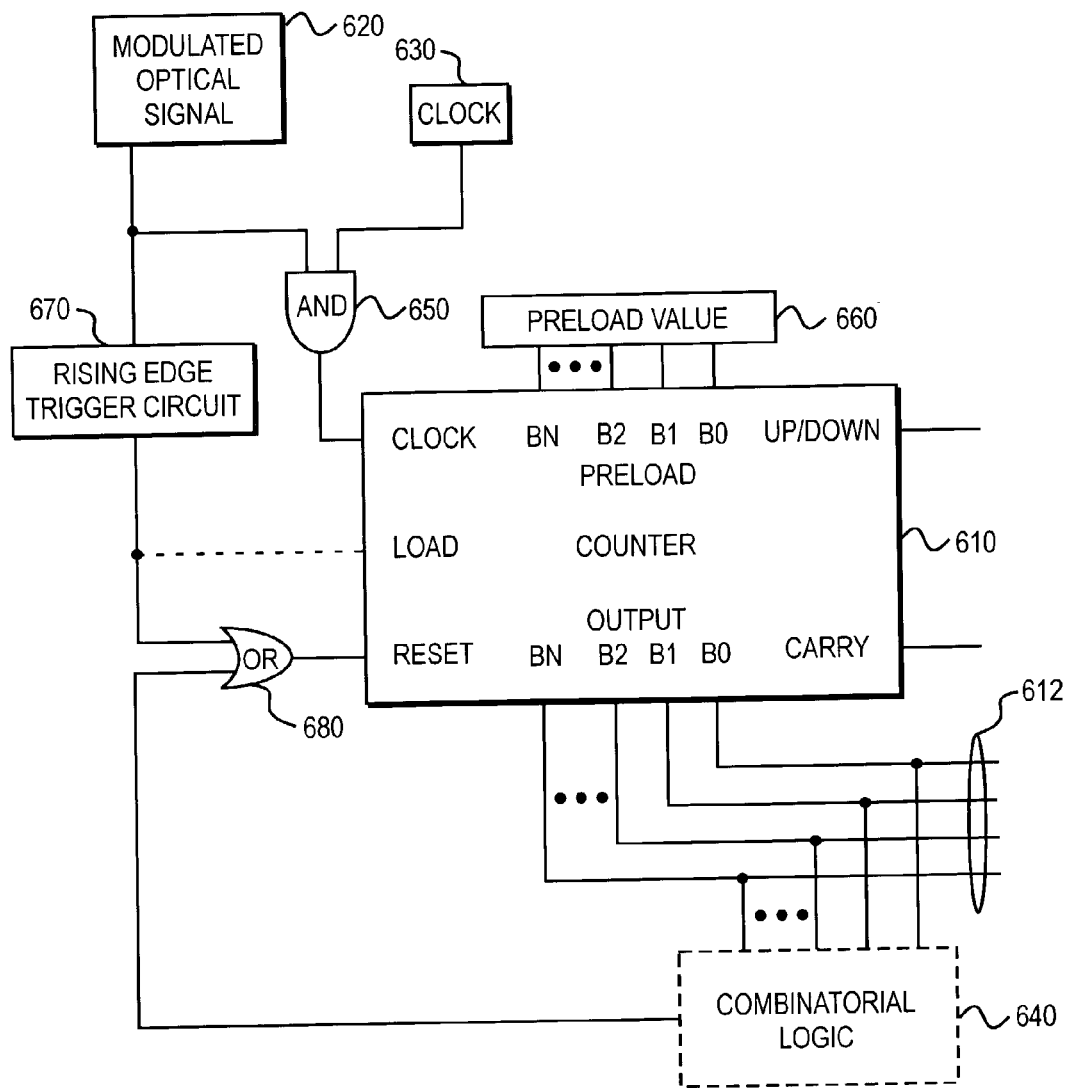
FIG. 6 illustrates one embodiment of a counter for extracting digital data communicated on a pulse width modulated optical signal.

FIG. 6 illustrates a demodulation counter 610 for extracting the digital data from the modulated optical signal. Various components are included to illustrate different ways to implement the demodulation function. Not all components are required in every implementation. Counter 610 includes a reset input to reset the counter to zero, a load input that causes the counter to initialize itself to the preload value 660 when asserted, and an up/down control to select whether the clock signal increments or decrements the count.

The counter 610 may be designed to rollover at a pre-determined count corresponding to the nominal pulse width at a given clock frequency. Alternatively, the counter 610 and combinatorial logic 640 may be configured to reset counter 610 once the nominal pulse width count is reached. In yet another embodiment, additional logic may be used to subtract a count corresponding to the nominal pulse width from the final count. In other embodiments, rising edge trigger circuitry 670 may be configured to preload the counter with a count corresponding to the nominal pulse width count (or its complement). In these embodiments, the counter effectively passes through a zero value after a number of increment or decrement operations reaches the nominal pulse width count.

Block 620 indicates the received modulated optical signal. AND gate 650 is used to gate clock 630 by the modulated optical signal 620 so that the counter 610 counts only during a pulse.

The rising edge of the pulse is detected by rising edge trigger circuit 670. In one embodiment, the rising edge causes the counter to be reset to zero. During the pulse, the counter counts at a rate determined by the clock. The falling edge of the pulse halts the counter.

In one embodiment, combinatorial logic 640 resets the counter to zero once the nominal pulse width count is reached. The counter will then continue counting until the falling edge of the modulated pulse. As long as the maximum modulated pulse width is not expected to exceed twice the nominal pulse width, the value indicated by the counter at the falling edge of the pulse is the digital data value being communicated.

In an alternative embodiment, the counter is designed as an n-bit counter wherein the nominal pulse width (i.e., standard bit time) produces a count of $2^n$ at the selected clock frequency. As a result, the counter experiences a "rollover" at the nominal pulse width count. Thus combinatorial logic 640 is not required. Counting continues after the rollover and the result is that the value indicated by the counter at the falling edge of the width modulated pulse is the digital data value being communicated.

In yet another embodiment, rising edge trigger circuit 670 causes the counter to be pre-loaded with a preload value (P) at the rising edge of the pulse. The preload value can be selected so that the counter "rolls over" or is reset (in conjunction with the combinatorial logic) to zero once the counter reaches the value P+M, where M is the nominal pulse width count. The counter continues counting so that at the actual falling edge of the modulated pulse, the count corresponds to the count by which the modulated pulse width exceeds the nominal pulse width. Thus the count corresponds to the digital data value being communicated.

Figure 7:
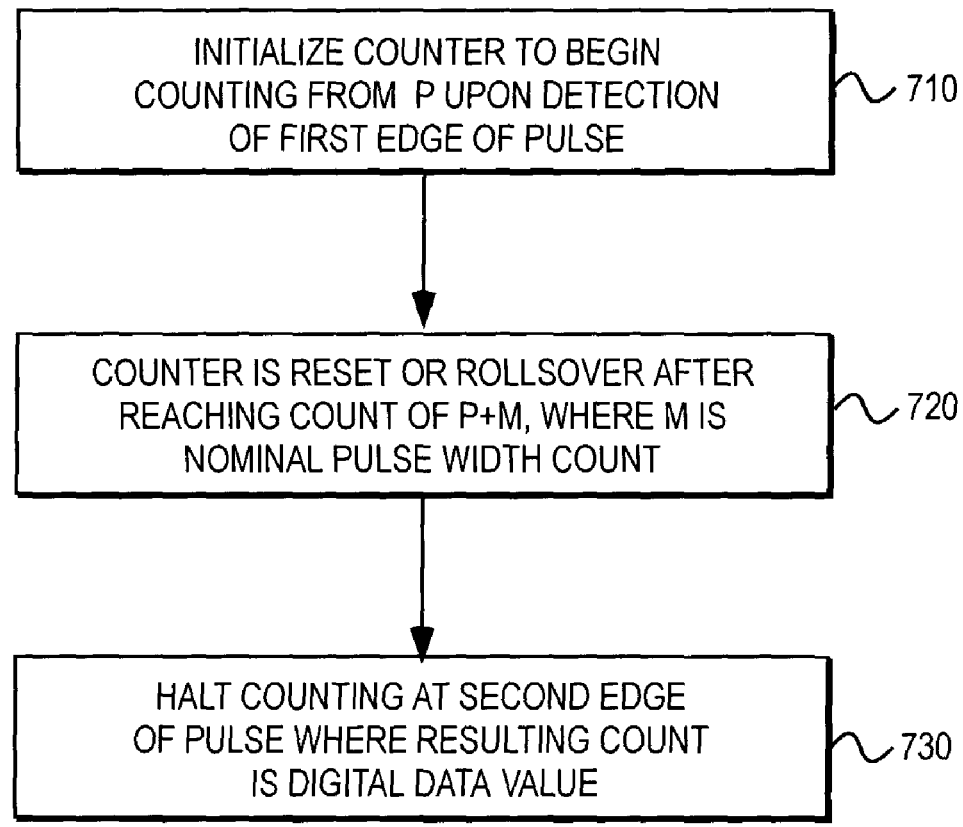
FIG. 7 illustrates one embodiment of demodulation of a pulse width modulated optical signal to recover digital data values using a counter.

FIG. 7 illustrates one embodiment of a method for demodulating a width modulated pulse to recover digital data. In step 710, the counter is initialized with a pre-determined value (P) in response to the rising edge of the pulse. The counter counts throughout the duration of the pulse as indicated in step 720. The pre-determined value is selected such that the counter experiences a rollover or is reset at M+P, where M represents the nominal pulse width count. In one embodiment, P=0. In step 730, the counter is halted in response to the falling edge of the pulse, where the resulting count corresponds to the value of the digital data being communicated.

Although, the counter can be designed to rollover at a fixed value or configured via combinatorial logic to rollover at a value less than its $2^n$ counting range, in reality an additional step may be required for negotiating a data rate for communication. Negotiation allows the transmitting and receiving ends of the communication link to adjust the transmission rate to achieve an optimal data rate based on constraints such as error rate and the data rates mutually supported by each end of the communication link. Thus in various embodiments, the value of P or M+P may be varied to accommodate changing data rates.

Figure 8:
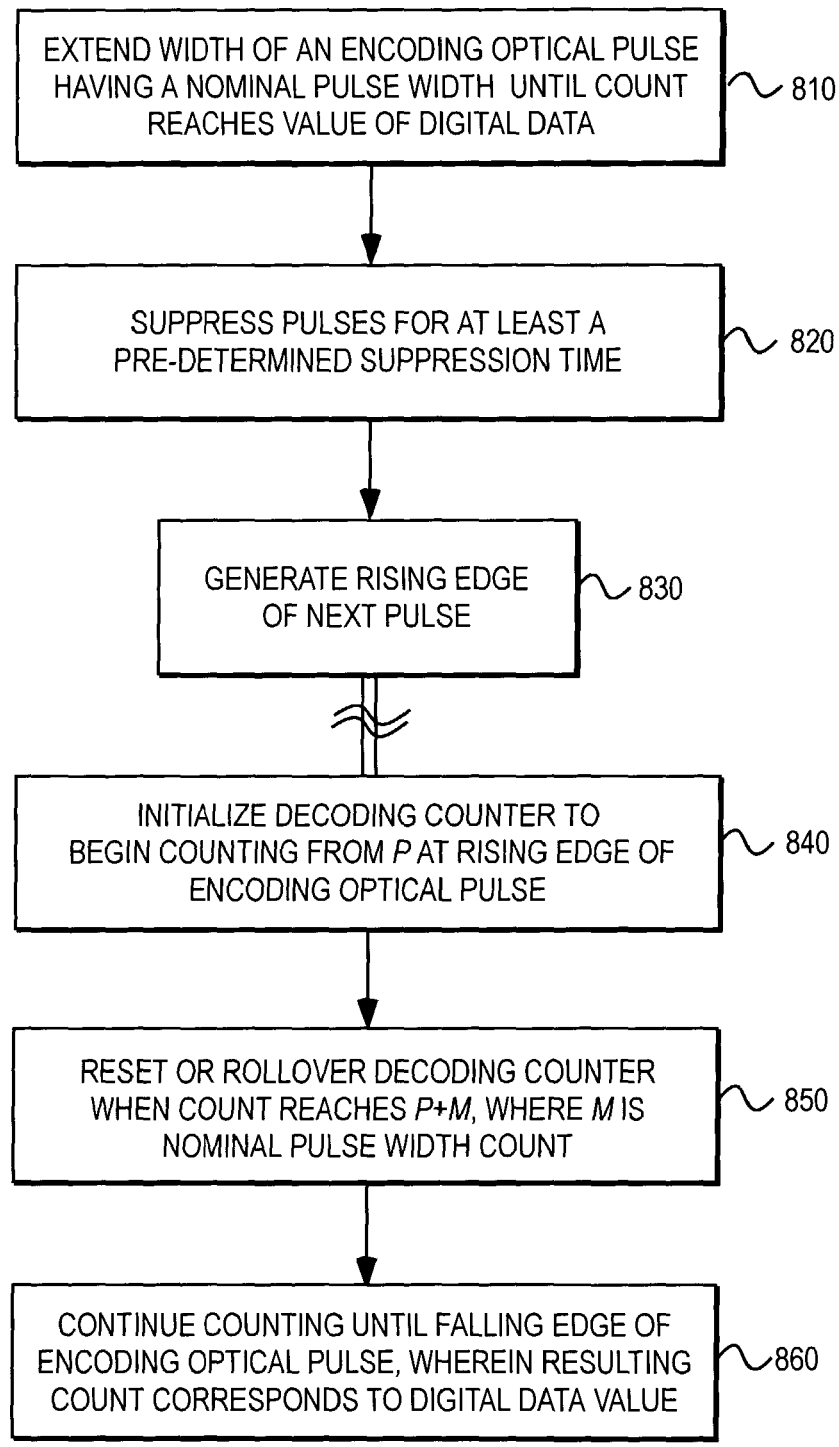
FIG. 8 illustrates one embodiment of a method for communicating digital data through pulse width modulation and demodulation of an optical signal.

FIG. 8 illustrates modulation and demodulation of a pulse waveform to convey a digital (rather than analog) value. In step 810, the width of an encoding optical pulse is extended beyond a nominal pulse width in accordance with the value of the digital data being communicated. This may be accomplished through the use of an encoding counter. In particular, the width of an encoding optical pulse having a nominal pre-determined pulse width is extended until the count of an encoding counter reaches the value of the digital data to be encoded in step 810.

In step 820, pulses are suppressed for at least a pre-determined suppression time. This is equivalent to ensuring a minimum zero count time so that system logic can accurately distinguish distinct pulses. In step 830, the rising edge of the next pulse is generated.

At the receiving end, a decoding counter is initialized to begin counting from the value P upon detection of the rising edge of the encoding optical pulse in step 840. In one embodiment P=0. In another embodiment, P≠0 such that the counter is loaded with a non-zero value at the rising edge of the optical signal pulse.

In one embodiment, the counter is reset (to zero) in step 850 when the count reaches the value P+M, where M is the nominal pulse width count. This may be accomplished through the use of combinatorial logic (e.g., combinatorial logic 640). An AND gate (or NAND gate for inverted resets) is applied to logically combine the counter outputs into the appropriate reset signal. The reset signal is then fed directly into the reset input of the counter. If P=0, the counter is reset once the count reaches the nominal pulse width count.

In an alternative embodiment, the counter is designed to rollover when the count reaches P+M in step 850. In the event P=0, the counter is configured to rollover once the count reaches the nominal pulse width count.

The counter continues counting after reset or rollover until the falling edge of the encoding optical pulse is encountered in step 860. The resulting count corresponds to the value of the digital data being communicated.

Given the ability of electronic circuitry to switch faster than the pulses of an optical signal in a conventional optical communication link, the optical PWM technique permits a greater data capacity than the optical PCM within the same time frame. Only one pulse and one zero are required to communicate a digital value that requires 4 standard bit times and 4 zero times in an optical PCM environment. Data compaction can thus be achieved when using the optical PWM technique. Faster clocks can be used to encode a greater range of values within the extended pulse as long as transmitter and receiver clocks can be synchronized and substantially matched in frequency.

Although various embodiments have been illustrated in the context of optical communication networks and optical fiber media, the described methods and apparatus may be applied in other types of communication networks utilizing other transmission mediums. Optical fiber is electrically non-conductive. One example of another electrically non-conductive transmission medium is the atmosphere through which microwave/radio waves from microwave or radio communication systems travel. The described invention may also be applied to carrier or non-carrier based communication systems relying on electrically conducting transmission medium such as coaxial cables.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of communicating digital data comprising:
   a) encoding digital data in a pulse width modulated signal;
   b) initiating counting by a counter upon detection of a first edge of a selected pulse of the signal, wherein the signal has a nominal pulse width count associated with an unmodulated pulse; and
   c) counting until detection of a second edge of the selected pulse, wherein a counter value indicates the digital data.

2. The method of claim 1 further comprising:
   d) resetting the counter after reaching the nominal pulse width count.

3. The method of claim 1 wherein the counter is configured to rollover at the nominal pulse width count.

4. The method of claim 1 wherein the pulse width modulated signal is an optical signal.

5. A method comprising:
   a) initializing a counter to a first value from which the counter begins counting upon receipt of a rising edge of a pulse of a pulse width modulated signal, wherein a width of a modulated pulse exceeds a nominal pulse width in accordance with a digital data value; and
   b) stopping the counter at the falling edge of the pulse, wherein the counter indicates the digital data value.

6. The method of claim 5 wherein the first value is zero.

7. The method of claim 5 wherein the first value is zero, wherein the nominal pulse width has an associated nominal pulse width count, wherein the counter is configured to rollover at the nominal pulse width count.

8. The method of claim 5 wherein the first value is zero, wherein the nominal pulse width has an associated nominal pulse width count, further comprising:
   c) resetting the counter to zero when the counter reaches the nominal pulse width count.

9. The method of claim 5 wherein the first value (P) is nonzero, wherein the nominal pulse width has an associated nominal pulse width count (M), wherein the first value is selected such that the counter experiences a rollover at P+M.

10. The method of claim 5 wherein the pulse width modulated signal is an optical signal.

11. A method comprising:
   a) extending a pulse width of a pulse having a nominal pulse width in accordance with a digital data value; and
   b) determining a count of a number of clock cycles that the extended pulse width exceeds the nominal pulse width, wherein the count corresponds to the digital data value.

12. The method of claim 11 wherein step b) further comprises:
   i) counting a number of clock cycles corresponding to a duration of the extended pulse; and
   ii) subtracting a number of clock cycles corresponding to a duration of the nominal pulse to generate the count corresponding to the digital data.

13. The method of claim 11 wherein the count is determined by a counter, wherein step b) further comprises:
   i) initializing the counter to zero upon detection of a first edge of the extended pulse;
   ii) resetting the counter to zero when the counter reaches a count representing the nominal pulse width; and
   iii) halting the counter upon detection of a second edge of the extended pulse.

14. The method of claim 11 wherein the count is determined by a counter, wherein step b) further comprises:
   i) initializing the counter to zero upon detection of a first edge of the extended pulse;
   ii) configuring the counter to rollover when the counter reaches a count representing the nominal pulse width; and
   iii) halting the counter upon detection of a second edge of the extended pulse.

15. The method of claim 11 wherein the count is determined by a counter, wherein step b) further comprises:
   i) initializing the counter to a non-zero value (P) upon detection of a first edge of the extended pulse;

ii) configuring the counter to rollover when the counter reaches a count of P+M, wherein M is a nominal pulse width count; and iii) halting the counter upon detection of a second edge of the extended pulse.

16. The method of claim 11 wherein the count is determined by a counter, wherein step b) further comprises:

i) initializing the counter to first non-zero value (P) upon detection of a first edge of the extended pulse;

ii) resetting the counter to zero when the counter reaches a count of P+M, wherein M is a nominal pulse width count; and iii) halting the counter upon detection of a second edge of the extended pulse.

17. The method of claim 11 wherein the pulse width modulated signal is an optical signal.

* * * * *